(12) United States Patent
Yu et al.

(10) Patent No.: US 12,536,986 B2
(45) Date of Patent: Jan. 27, 2026

(54) NOISE REDUCTION EARPAD, NOISE REDUCTION EARMUFF AND NOISE REDUCTION HEADPHONE

(71) Applicant: SHENZHEN GRANDSUN ELECTRONIC CO., LTD., Guangdong (CN)

(72) Inventors: Xin Yu, Shenzhen (CN); Weiyong Gong, Shenzhen (CN); Haiquan Wu, Shenzhen (CN)

(73) Assignee: SHENZHEN GRANDSUN ELECTRONIC CO., LTD., Shenzhen (CN)

( * ) Notice: Subject to any disclaimer, the term of this patent is extended or adjusted under 35 U.S.C. 154(b) by 127 days.

(21) Appl. No.: 18/271,304

(22) PCT Filed: May 18, 2021

(86) PCT No.: PCT/CN2021/094424
§ 371 (c)(1),
(2) Date: Jul. 7, 2023

(87) PCT Pub. No.: WO2022/241651
PCT Pub. Date: Nov. 24, 2022

(65) Prior Publication Data
US 2024/0071352 A1 Feb. 29, 2024

(51) Int. Cl.
*G10K 11/168* (2006.01)
*H04R 1/10* (2006.01)
(52) U.S. Cl.
CPC ......... *G10K 11/168* (2013.01); *H04R 1/1083* (2013.01); *H04R 1/1091* (2013.01)

(58) Field of Classification Search
CPC ... G10K 11/168; H04R 1/1083; H04R 1/1091
See application file for complete search history.

(56) References Cited

U.S. PATENT DOCUMENTS 4,856,118 A * 8/1989 Sapiejewski ............ A61F 11/14
381/372
4,905,322 A * 3/1990 Aileo ..................... A42B 3/166
181/129

(Continued)

FOREIGN PATENT DOCUMENTS

CN 201887919 U 6/2011
CN 102487469 A 6/2012

(Continued)

OTHER PUBLICATIONS

JP Office Action dated Aug. 5, 2024 in application 2023541880.

(Continued)

*Primary Examiner* — Forrest M Phillips
(74) *Attorney, Agent, or Firm* — Maschoff Brennan

(57) ABSTRACT

The noise reduction earpad includes: an earpad body and an earpad cover, the earpad body is made of a porous flexible material or a foam flexible material and being in a ring shape and being connected to the connection surface, the earpad body and the connection surface jointly forming a sealed and soundproof space provided with a chamber structure having an opening; the earpad cover includes a cloth cover covering at least an exposed outer surface of the earpad body and made of a cloth material and a sealed and soundproof film attached to a side surface of cloth cover facing the earpad body and made of a soft rubber, a laying area of the sealed and soundproof film is corresponding to an outer surface of the earpad body facing away from the sealed and soundproof space.

13 Claims, 4 Drawing Sheets

(56) References Cited

U.S. PATENT DOCUMENTS

| | | | |
|---|---|---|---|
| 2009/0180657 A1* | 7/2009 | Isvan | H04R 1/2849 |
| | | | 381/371 |
| 2010/0119076 A1* | 5/2010 | Monk | A61F 11/14 |
| | | | 381/71.6 |
| 2011/0216909 A1* | 9/2011 | Sapiejewski | H04R 1/1083 |
| | | | 381/371 |
| 2015/0139434 A1 | 5/2015 | Sibbald | |
| 2017/0034625 A1* | 2/2017 | Wick | H04R 7/02 |
| 2017/0366894 A1 | 12/2017 | Ulrich et al. | |
| 2019/0038471 A1 | 2/2019 | Naya et al. | |
| 2019/0374386 A1 | 12/2019 | Halfaker | |
| 2021/0112326 A1 | 4/2021 | Bogan et al. | |

FOREIGN PATENT DOCUMENTS

| | | |
|---|---|---|
| CN | 202565448 U | 11/2012 |
| CN | 103108267 A | 5/2013 |
| CN | 204761654 U | 11/2015 |
| CN | 205105363 U | 3/2016 |
| CN | 205864675 U | 1/2017 |
| CN | 107750026 A | 3/2018 |
| CN | 207968819 U | 10/2018 |
| CN | 111491224 A | 8/2020 |
| CN | 111935580 A | 11/2020 |
| JP | 2000112482 A | 4/2000 |
| JP | 2007086505 A | 4/2007 |
| JP | 2017530618 A | 10/2017 |
| JP | 2020188370 A | 11/2020 |

OTHER PUBLICATIONS

Chinese Search Report dated Mar. 7, 2023 as received in Application No. 202180001185.6.

Extended European Search Report dated Feb. 9, 2024 as received in Application No. 21940108.0.

* cited by examiner

NOISE REDUCTION EARPAD, NOISE REDUCTION EARMUFF AND NOISE REDUCTION HEADPHONE

CROSS REFERENCE TO RELATED APPLICATION

This present application is a National Stage Appl. of International Patent Application No. PCT/CN2021/094424 with an international filing date of May 18, 2021 designating the United States, now pending. The content of which is incorporated herein by reference.

TECHNICAL FIELD

The present application relates to the technical field of headphones, and more particularly to a noise reduction earpad, a noise reduction earmuff, and a noise reduction headphone.

BACKGROUND

The noise reduction earpad is connected to a connection surface of a mounting member, and the noise reduction earpad includes an earpad body made of flexible material with multiple voids or pores and being in a ring shape, a cloth cover enclosing the earpad body and a soundproof cover arranged between the earpad body and the cloth cover. The earpad body and the connection surface form a sealed and soundproof space together, the sealed and soundproof space is provided with a chamber structure having an opening. The cloth cover is made of a cloth material to provide comfortableness when the noise reduction earpad is in contact with human skin, and the soundproof cover is used to reduce the external sound that enters the sealed space by penetrating through the cloth cover and the earpad body, the soundproof cover is made of a leather or a soft rubber. The earpad body, the cloth cover and the soundproof cover are mutually independent components, and independent assembly steps are required for the cloth cover and the soundproof cover in their respective assembly processes, that is, two assembly steps need to be performed to complete the assembly of the noise reduction earpad.

SUMMARY

One of the objects of embodiments of the present application is to provide a noise reduction earpad, a noise reduction earmuff, and a noise reduction headphone, in order to reduce assembly steps of the noise reduction earpad, and improve the assembly efficiency of the noise reduction earpad.

In order to solve above technical problem, the technical solution adopted in an embodiment of the present application is that:

a noise reduction earpad connected to a connection surface of an earpad holder, and the noise reduction earpad includes: an earpad body made of a porous flexible material or a foam flexible material and being in a ring shape and being connected to the connection surface, the earpad body and the connection surface jointly forming a sealed and soundproof space provided with a chamber structure having an opening; the noise reduction earpad further includes an earpad cover, and the earpad cover includes a cloth cover covering at least an exposed outer surface of the earpad body and made of a cloth material and a sealed and soundproof film attached to a side surface of cloth cover facing the earpad body and made of a soft rubber, a laying area of the sealed and soundproof film is corresponding to an outer surface of the earpad body facing away from the sealed and soundproof space.

In an embodiment, the laying area of the sealed and soundproof film is corresponding to an outer surface of the earpad body facing away from the connection surface;

or the laying area of the sealed and soundproof film is corresponding to an inner side surface of the cloth cover, and the laying area of the sealed and soundproof film facing the sealed and soundproof space and facing the connection surface is provided with at least one perforating air hole.

In an embodiment, a thickness of the sealed and soundproof film is ranged from 0.005 mm to 0.1 mm.

In an embodiment, a side surface of the sealed and soundproof film facing away from the earpad body is provided with an insertion layer located in the cloth cover.

In an embodiment, the cloth cover covers the earpad body.

The present application further provides a noise reduction earpad connected to a connection surface of an earpad holder, and the noise reduction earpad includes: an earpad body made of a porous flexible material or a foam flexible material and being in a ring shape and being connected to the connection surface, the earpad body and the connection surface jointly forming a sealed and soundproof space provided with a chamber structure having an opening; the noise reduction earpad further includes an earpad cover, and the earpad cover includes a cloth cover covering at least an exposed outer surface of the earpad body and made of a cloth material and a sealed and soundproof film arranged in the cloth cover and made of a soft rubber, a laying area of the sealed and soundproof film is corresponding to an outer surface of the earpad body facing away from the sealed and soundproof space.

In an embodiment, the laying area of the sealed and soundproof film is corresponding to an outer surface of the earpad body facing away from the connection surface; or the laying area of the sealed and soundproof film is corresponding to an inner side surface of the cloth cover, and the laying area of the sealed and soundproof film facing the sealed and soundproof space and facing the connection surface is provided with at least one perforating air hole.

In an embodiment, a thickness of the sealed and soundproof film is ranged from 0.005 mm to 0.1 mm.

The present application further provides a noise reduction earmuff, and the noise reduction earmuff includes the noise reduction earpad mentioned above.

The present application further provides a noise reduction headphone, and the noise reduction headphone includes the noise reduction earpad mentioned above.

The beneficial effects of an embodiment of the present application are that: in the assembly process, after the earpad cover is assembled to the earpad body, the assembly of the noise reduction earpad is completed, that is the assembly of the noise reduction earpad is completed only one assembly step is needed. Compared with the prior art, the assembly steps of the noise reduction earpad are reduced, the assembly efficiency of the noise reduction earpad is improved, and the manufacturing cost of the noise reduction earpad is reduced by reducing the materials used compared with the prior art.

In addition, since the material of the cloth cover can be a microfiber, a knitted fabric, etc., therefore, there are differences in material selection, weaving process, manufacturing control, etc. of the cloth cover, the hole size, density, thickness and other characteristics of the same cloth or different cloth types formed in the same batch are different, and the above characteristics of the batch cloth types produced at different times are more different, so that the sealing difference of sealed and soundproof spaces formed by the cloth covers is larger, which cannot match the active noise reduction filter and algorithm, and the manufactured noise reduction earpad has a great difference in effect, and the application of noise reduction earpad in the noise reduction headphone is limited. Based on the present application, the sealed and soundproof film keeps the air pressure in the sealed and soundproof space stable, the frequency response curve in the sealed and soundproof space is smooth, the fluctuation range is small, the consistency is high, the debugging noise reduction function is more efficient, the time is short, the effect is better, and the selection range of cloth cover is expanded to any cloth type, which can better meet the diversified and personalized needs, and promote the development of the noise reduction earpad, the noise reduction earmuff and the noise reduction headphone technology.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Other drawings are obtained from these drawings.

Figure 1:
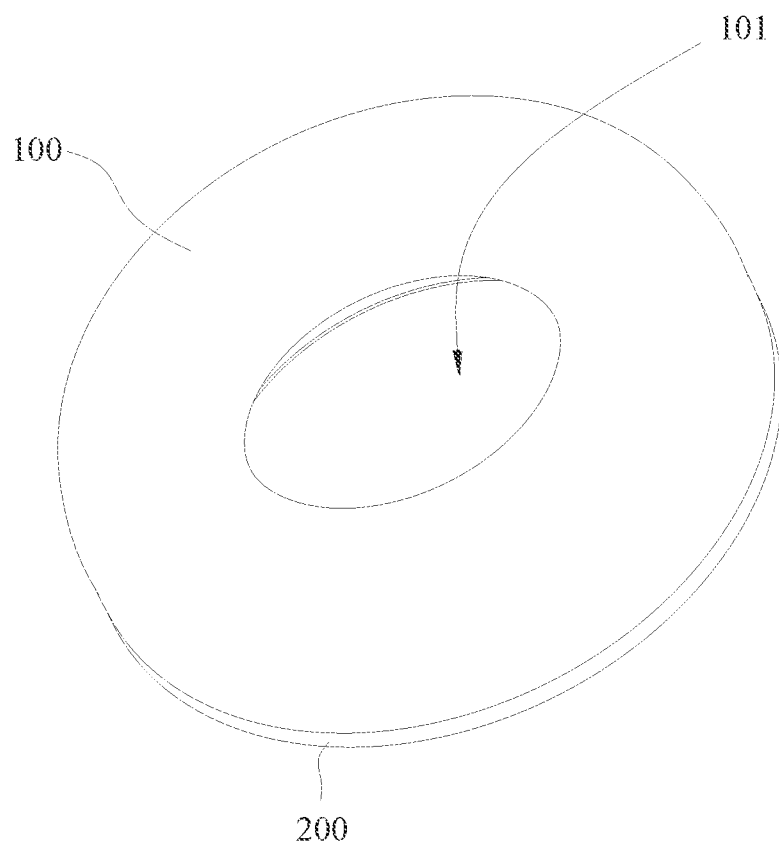
FIG. 1 is a perspective view of a noise reduction earpad provided in Embodiment 1 of the present application.

In the drawings, the reference signs are listed:

TABLE 1

| Reference sign | feature | Reference sign | feature |
| --- | --- | --- | --- |
| 100 | noise reduction earpad | 101 | sealed and soundproof space |
| 110 | earpad body | | |
| 120 | earpad cover | | |
| 121 | cloth cover | 122 | sealed and soundproof film |
| 123 | cloth and film mixed layer | | |
| 200 | earpad holder | | |
| 201 | connecting surface | | |

DETAILED DESCRIPTION OF EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

Embodiment 1

As shown in FIGS. 1 to 4, the embodiment of the present application provides a noise reduction earpad 100.

The noise reduction earpad 100 is connected to a connection surface 201 of the earpad holder 200, where, if the noise reduction earpad 100 is applied to the noise reduction earmuff, the earpad holder 200 is the connection frame of the noise reduction earmuff, and if the noise reduction earpad 100 is used for the noise reduction headphone, the earpad holder 200 is the speaker cover of the noise reduction headphone.

The noise reduction earpad 100 includes an earpad body 110 and an earpad cover 120.

The earpad body 110 is made of a porous flexible material or a foam flexible material and is in a ring shape and connected to the connection surface. The porous flexible material is a stacked material that deforms under pressure, including but not limited to a cotton, a fiber, etc. The foam flexible material includes but not limited to a sponge, etc., which can be an opened type or a non-closed pore type. The earpad body 110 and the connection surface 201 jointly form a sealed and soundproof space 101 provided with a chamber structure having an opening. The earpad body 110 plays a role in the overall modeling of the noise reduction earpad 100, that is, the modeling of the earpad body 110 is generally equivalent to that of the noise reduction earpad 100. The earpad body 110 adapts to compression and deformation of the human head when the noise reduction earpad 100 is in contact with the human head during used. The earpad cover 120 includes a cloth cover 121 covering at least the exposed outer surface of the earpad body 110 and made of a cloth material, and a sealed and soundproof film 122 made of a soft rubber and attached to the side surface of the cloth cover 121 facing the earpad body 110. The laying area of the sealed and soundproof film 122 is corresponding to the outer surface of the earpad body 110 facing away from the sealed and soundproof space 101.

During used, firstly, since the earpad body 110 is made of a porous flexible material or a foam flexible material, the cloth cover 121 is made of cloth material and the sealed and soundproof film 122 is made of a soft rubber, the noise reduction earpad 100 is in contact with the human head, and the portion where the noise reduction earpad 100 is in contact with the human head will adapt to deformation, such that the sealed and soundproof space 101 is isolated from the external space and forms a closed space. Secondly, the noise reduction earpad 100 is in contact with the human head through the earpad cover 120, and since the cloth is made of a silk, there are micro gaps between the silks with good air permeability. Therefore, based on this structure, the user has better comfortableness when using. Finally, after the noise reduction earpad 100 is in contact with the human head, since only the outer surface of the earpad body 110 facing away from the sealed and soundproof space 101 will also allow the sound to propagate to the sealed and soundproof space 101, therefore, the laying area of the sealed and soundproof film 122 only needs to correspond to the outer surface of the earpad body 110 facing away from the sealed and soundproof space 101 to limit the propagation of sound to the sealed and soundproof space 101 through the outer surface of the earpad body 110 facing away from the sealed and soundproof space 101, thus the noise reduction effect of the noise reducing earpad 100 is realized.

Based on the structural design, during the assembly process, after the earpad cover 120 is assembled to the earpad body 110, the assembly of the noise reduction earpad 100 is completed, that is, the assembly of the noise reduction earpad 100 can be completed in only one assembly step. Compared with the prior art, the assembly steps of the noise reduction earpad 100 are reduced, and the assembly efficiency of the noise reduction earpad 100 is improved.

In addition, since the material of the cloth cover 121 can be a microfiber, a knitted fabric, etc., therefore, there are differences in material selection, weaving process, manufacturing control, etc. of the cloth cover 121, the hole size, density, thickness and other characteristics of the same cloth or different cloth types formed in the same batch are different, and the above characteristics of the batch cloth types produced at different times are more different, so that the sealing difference of sealed and soundproof spaces 101 formed by the cloth covers 121 is larger, which cannot match the active noise reduction filter and algorithm, and the manufactured noise reduction earpad 100 has a great difference in effect, and the application of noise reduction earpad 100 in the noise reduction headphone is limited. Based on the present application, the sealed and soundproof film 122 keeps the air pressure in the sealed and soundproof space 101 stable, the frequency response curve in the sealed and soundproof space 101 is smooth, the fluctuation range is small, the consistency is high, the debugging noise reduction function is more efficient, the time is short, the effect is better, and the selection range of cloth cover 121 is expanded to any cloth type, which can better meet the diversified and personalized needs, and promote the development of the noise reduction earpad 100, the noise reduction earmuff and the noise reduction headphone technology.

It should be noted here that when the noise reduction earpad 100 is applied to the noise reduction headphone, since the laying area of the sealed and soundproof film 122 does not restrict the sound transmission from the sealed and soundproof space 101 to the earpad body 110, the space occupied by the earpad body 110 can also be the sound field space when the noise reduction headphone plays the sound, which is beneficial to improve the stereo sound effect of the noise reduction headphone.

It should also be noted that in the existing noise reduction earpad 100, the earpad body 110, the cloth cover 121 and the soundproof cover are independent components. During the using process, such as the soundproof cover cracks, based on the material characteristics of the soundproof cover, both sides of the crack prone to dislocation, so that the length of the crack will expand rapidly, and after the length of the crack is too large, a larger leakage port is formed on the soundproof cover, and the leakage port allows sound transmission, thereby reducing the soundproof effect of the soundproof cover. In order to prevent the soundproof cover from easily being cracked during the using process, the thickness of the soundproof cover is needed to be increased under the chamber where the soundproof cover has realized the soundproof effect; therefore, the thickness of the soundproof cover is usually greater than the thickness of the cloth cover 121, which leads to an increase in material, and then increase the cost of noise reduction earpad 100.

In the embodiment of the present application, even if a crack occurs in the sealed and soundproof film 122, since the sealed and soundproof film 122 is attached to the side surface of the cloth cover 121 facing the earpad body 110, both sides of the crack of the sealed and soundproof film 122 will not be dislocated under the restriction of the cloth cover 121, and the cloth cover 121 also restricts the length expansion of the crack of the sealed and soundproof film 122, and the larger leakage port will not be formed on the sealed and soundproof film 122. Therefore, based on the structural design of the present application, it is no longer necessary to increase the thickness of the sealed and soundproof film 122 under the chamber where the sealed and soundproof film 122 has realized the soundproof effect, and the thickness of the sealed and soundproof film 122 will be less than the thickness of the cloth cover 121. Compared with the prior art, the use of materials is reduced, and the manufacturing cost of noise reduction earpad 100 is reduced.

Specifically, in the embodiment of the present application, the thickness of the sealed and soundproof film 122 is ranged from 0.005 mm to 0.1 mm.

Figure 2:
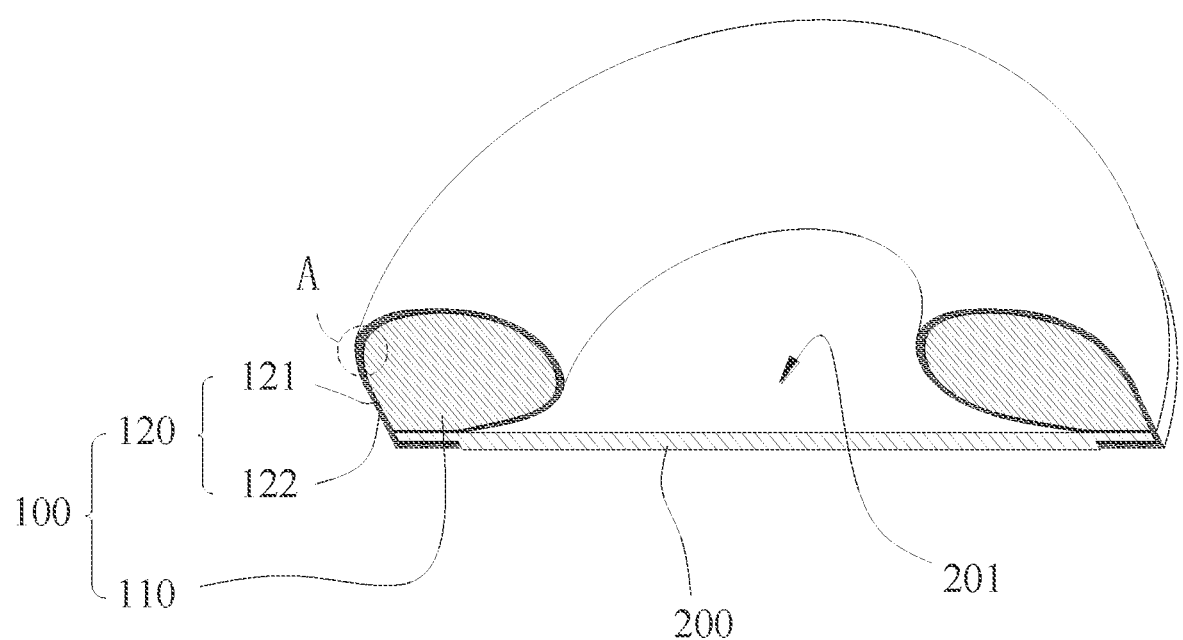
FIG. 2 is a perspective cross-sectional view of a noise reduction earpad provided in Embodiment 1 of the present application.
Figure 3:
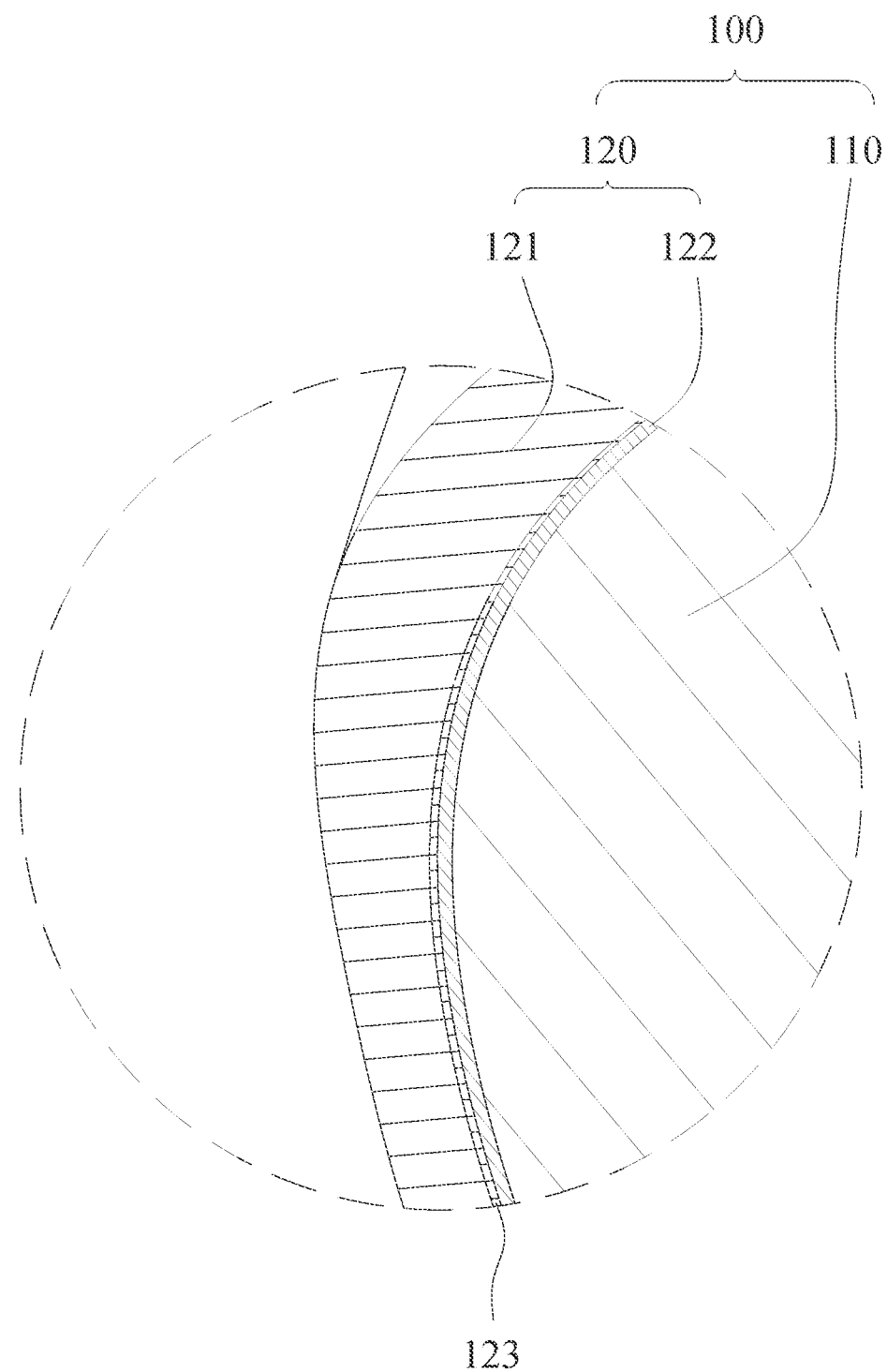
FIG. 3 is schematic view of an enlarged structure of A in FIG. 2.
Figure 4:
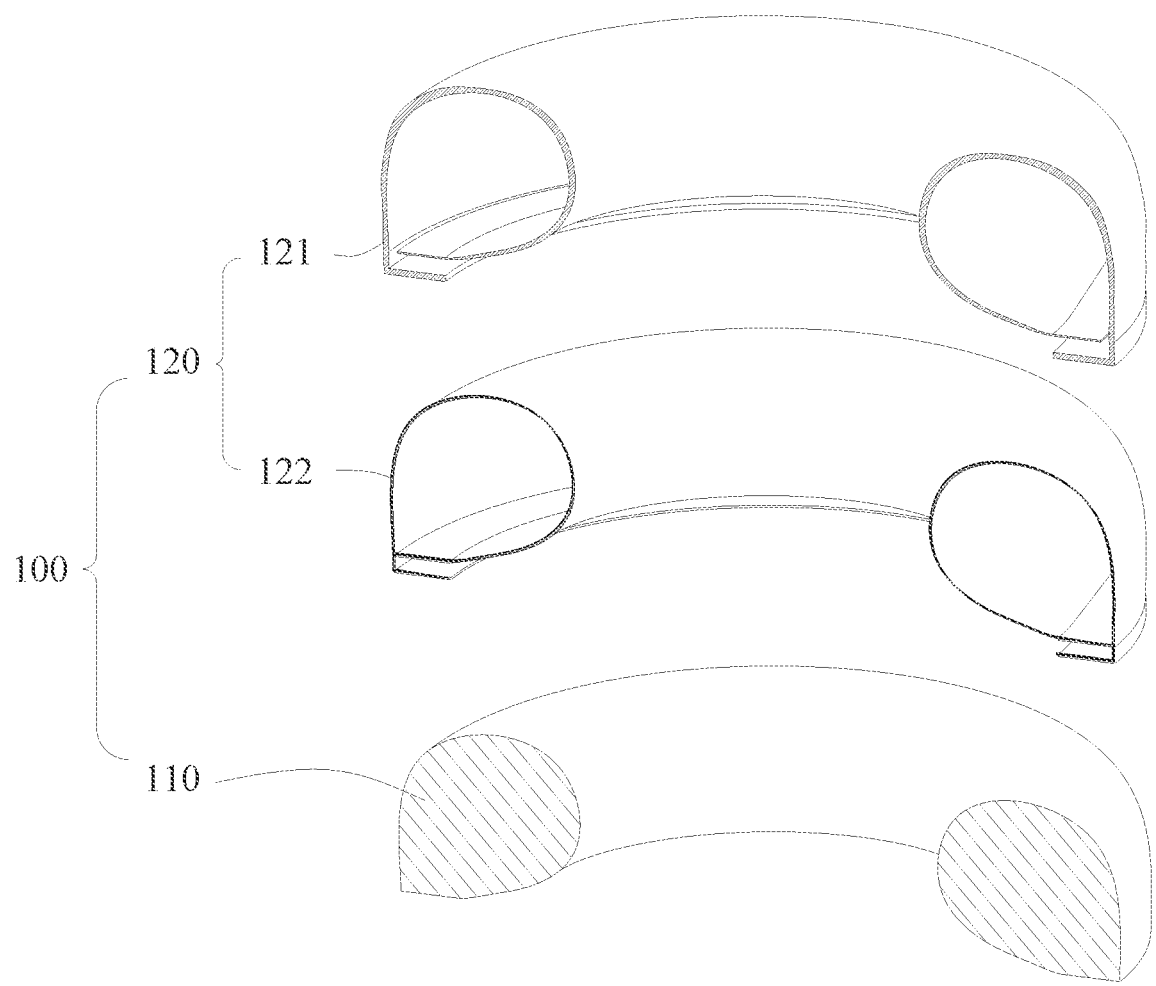
FIG. 4 is an explosion view of a noise reduction earpad provided in Embodiment 1 of the present application.

As shown in FIGS. 2 to 4, in the embodiment of the present application, the laying area of the sealed and soundproof film 122 also corresponds to the outer surface of the earpad body 110 facing away from the connection surface 201.

During used, after the noise reduction earpad 100 is in contact with the human head, the portion of the noise reduction earpad 100 close to the human head will be deformed, so that the side surface of the earpad body 110 facing the sealed and soundproof space 101 and close to the human head is likely to turn outwardly. Therefore, when the side surface of the earpad body 110 facing the sealed and soundproof space 101 and close to the human head is turned outward, for example, the laying area of the sealed and soundproof film 122 only corresponds to the outer surface of the earpad body 110 facing away from the sealed and soundproof space 101, the sound outside the sealed soundproof space 101 propagates to the sealed soundproof space 101 through the side surface of the earpad body 110 that is turned outward, which affects the noise reduction effect of the noise reduction earpad 100. Based on this structural design, since the laying area of the sealed and soundproof film 122 is also corresponding to the outer surface of the earpad body 110 facing away from the connection surface 201, even if the side surface of the earpad body 110 facing the sealed and soundproof space 101 and close to the human head is turned outward, the sealed and soundproof film 122 can still restrict the transmission of sound through the earpad body 110 to the sealed and soundproof space 101.

Further, as shown in FIGS. 2 to 4, in the embodiments of the present application, the laying area of the sealed and soundproof film 122 corresponds to the inner face of the cloth cover 121, and the laying area of the sealed and soundproof film 122 is provided with at least one air hole penetrating the laying area and facing both the sealed and soundproof space 101 and the connection surface 201. Based on this, firstly, in the process of manufacturing the earpad cover 120, it is not necessary to firstly distinguish which areas need to be provided with the sealed and soundproof film 122, and then to provide the air holes on the sealed and soundproof film, so as to improve production efficiency. Secondly, if the space enclosed by the sealed and soundproof film 122 is a closed space, and forms a structure similar to a balloon. This will cause the earpad body 110 to be unable to perform adaptive deformation on the human head during used. The space enclosed by the sealed and soundproof film 122 is prevented from being a closed space by arranging the air holes. Thus, during the compression deformation of the noise reduction earpad 100, the gas in the sealed and soundproof film 122 will be discharged through the air holes. When the deformation of the noise reduction earpad 100 is restored, the external gas will enter the space enclosed by the sealed and soundproof film 122 through the air holes to ensure the normal use of the noise reduction earpad 100.

In the embodiment of the present application, four air holes are provided, and the four air holes are arranged in a ring array.

As shown in FIG. 3, in the embodiment of the present application, a side surface of the sealed and soundproof film 122 facing away from the earpad body 110 is provided with an insertion layer located in the cloth cover 121, that is, the insertion layer is mixed into the cloth cover 121, a portion of the sealed and soundproof film 122 facing away from is inserted into the cloth cover 121, and the insertion layer is located in the cloth cover 121 with a micro gap between wires in the cloth cover 121, and the wires in the cloth cover 121 can firmly attach the sealed and soundproof film 122 to the cloth cover 121 without the need for other adhesive materials to achieve adhesion.

It should be noted that in the manufacturing process of the earpad cover 120, the inner side surface of the cloth cover 121 can be first made, and then the molten glue is laid on the inner side surface of the cloth cover 121. Under the action of gravity, the lower side of the molten glue will penetrate into the cloth cover 121, and the sealed and soundproof film 122 will be formed after the molten glue is solidified, and the sealed and soundproof film 122 is attached to the cloth cover 121. The sealed and soundproof film 122 can also be directly hot pressed to the cloth cover 121, the use of hot pressing to make the sealed and soundproof film 122 produce certain melting characteristics, and under the action of pressure, the sealed and soundproof film 122 will penetrate partially into the cloth cover 121.

It should be noted here that, in combination with FIG. 3, the overlapped part of the insertion layer and the cloth cover 121 is the cloth and film mixed layer 123.

Embodiment 2

The difference between the embodiment and Embodiment 1 is that the sealed and soundproof film 122 is arranged in the cloth cover 121, that is, the sealed and soundproof film 122 is placed in a cloth cover 121 as a whole.

The technical effects played by the embodiment include the technical effects played in Embodiment 1, which will not be further described here.

In addition, there are micro gaps between wires of the cloth cover 121, and the sealed and soundproof film 122 is located in the cloth cover 121 as a whole, and the wires in the cloth cover 121 can firmly fix the sealed and soundproof film 122 to the cloth cover 121, without other adhesive materials to achieve adhesion.

In the manufacturing process of the earpad cover 120, the inner side surface of the cloth cover 121 can be first made, and then the molten glue is laid on the inner side surface of the cloth cover 121. Under the action of gravity, the lower side of the molten glue will penetrate into the cloth cover 121, and the sealed and soundproof film 122 will be formed after the molten glue is solidified.

In the embodiment of the present application, the laying area of the sealed and soundproof film 122 also corresponds to the outer surface of the earpad body 110 facing away from the connection surface 201.

Further, in embodiments of the present application, the laying area of the sealed and soundproof film 122 is provided with at least one air hole penetrating the laying area and facing both the sealed and soundproof space 101 and the connection surface 201.

In the embodiment of the present application, the thickness of the sealing soundproof film 122 is ranged from 0.005 mm to 0.1 mm.

It should be noted here that, for the same structure as Embodiment 1 in the embodiment, the technical effects played by the embodiment and the technical effects played by Embodiment 1 will not be further described here.

Embodiment 3

The application also proposes a noise reduction earmuff, which includes a noise reduction earpad 100. The specific structure of the noise reduction earpad 100 is referred to the above embodiments. Since the noise reduction earmuff adopts all the technical solutions of the above embodiments, which also has all the beneficial effects brought by the technical solutions of the above embodiments, which will not be repeated here.

Embodiment 4

The present application further provides a noise reduction headphone, which includes the noise reduction earpad 100. The specific structure of the noise reduction earpad 100 is referred to the above embodiments. Since the noise reduction headphone adopts all the technical solutions of the above embodiments, which also has all the beneficial effects brought by the technical solutions of the above embodiments, which will not be repeated here.

The above is only a better embodiment of the present application and is not intended to limit the present application. Any modification, equivalent replacement or improvement made within the spirit and principles of the present application shall be within the present application.

What is claimed is:

1. A noise reduction earpad, connected to a connection surface of an earpad holder, and comprising: an earpad body made of a porous flexible material or a foam flexible material and being in a ring shape and being connected to the connection surface, the earpad body and the connection surface jointly forming a sealed and soundproof space provided with a chamber structure having an opening; and wherein the noise reduction earpad further comprises an earpad cover, and the earpad cover comprises a cloth cover covering at least an exposed outer surface of the earpad body and made of a cloth material and a sealed and soundproof film attached to a side surface of cloth cover facing the earpad body and made of a soft rubber, a laying area of the sealed and soundproof film is corresponding to an outer surface of the earpad body facing away from the sealed and soundproof space; and wherein the laying area of the sealed and soundproof film is fused and attached to an inner side surface of the cloth cover.

2. The noise reduction earpad according to claim 1, wherein the laying area of the sealed and soundproof film is further corresponding to an outer surface of the earpad body facing away from the connection surface; or the laying area of the sealed and soundproof film facing both the sealed and soundproof space and the connection surface is provided with at least one air hole penetrating the laying area.

3. The noise reduction earpad according to claim 1, wherein a thickness of the sealed and soundproof film is ranged from 0.005 mm to 0.1 mm.

4. The noise reduction earpad according to claim 1, wherein a side surface of the sealed and soundproof film facing away from the earpad body is provided with an insertion layer located in the cloth cover.

5. The noise reduction earpad according to claim 1, wherein the cloth cover covers the earpad body.

6. A noise reduction earpad, connected to a connection surface of an earpad holder, and comprising: an earpad body made of a porous flexible material or a foam flexible material and being in a ring shape and being connected to the connection surface, the earpad body and the connection surface jointly forming a sealed and soundproof space provided with a chamber structure having an opening; and wherein the noise reduction earpad further comprises an earpad cover, and the earpad cover comprises a cloth cover covering at least an exposed outer surface of the earpad body and made of a cloth material and a sealed and soundproof film arranged in the cloth cover and made of a soft rubber, a laying area of the sealed and soundproof film is corresponding to an outer surface of the earpad body facing away from the sealed and soundproof space, and the laying area of the sealed and soundproof film is fused and attached to an inner side surface of the cloth cover.

7. The noise reduction earpad according to claim 6, wherein the laying area of the sealed and soundproof film is corresponding to an outer surface of the earpad body facing away from the connection surface; or and the laying area of the sealed and soundproof film facing both the sealed and soundproof space and the connection surface is provided with at least one air hole penetrating the laying area.

8. The noise reduction earpad according to claim 6, wherein a thickness of the sealed and soundproof film is ranged from 0.005 mm to 0.1 mm.

9. A noise reduction headphone, comprising a noise reduction earpad connected to a connection surface of an earpad holder, and comprising: an earpad body made of a porous flexible material or a foam flexible material and being in a ring shape and being connected to the connection surface, the earpad body and the connection surface jointly forming a sealed and soundproof space provided with a chamber structure having an opening; and wherein the noise reduction earpad further comprises an earpad cover, and the earpad cover comprises a cloth cover covering at least an exposed outer surface of the earpad body and made of a cloth material and a sealed and soundproof film attached to a side surface of cloth cover facing the earpad body and made of a soft rubber, a laying area of the sealed and soundproof film is corresponding to an outer surface of the earpad body facing away from the sealed and soundproof space, and the laying area of the sealed and soundproof film is fused and attached to an inner side surface of the cloth cover.

10. The noise reduction headphone according to claim 9, wherein the laying area of the sealed and soundproof film is further corresponding to an outer surface of the earpad body facing away from the connection surface; or the laying area of the sealed and soundproof film facing both the sealed and soundproof space and the connection surface is provided with at least one air hole penetrating the laying area.

11. The noise reduction headphone according to claim 9, wherein a thickness of the sealed and soundproof film is ranged from 0.005 mm to 0.1 mm.

12. The noise reduction headphone according to claim 9, wherein a side surface of the sealed and soundproof film facing away from the earpad body is provided with an insertion layer located in the cloth cover.

13. The noise reduction headphone according to claim 9, wherein the cloth cover covers the earpad body.

* * * * *